United States Patent
Wu

(10) Patent No.: US 6,615,706 B1
(45) Date of Patent: Sep. 9, 2003

(54) GRILLER HAVING A TEMPERATURE SENSING DEVICE WITH A TIMED ALARM CAPABILITY

(75) Inventor: Tsan-Kuen Wu, Tainan Hsien (TW)

(73) Assignee: Tsan Kuen USA INC, Pasadena, CA (US)

( * ) Notice: Subject to any disclaimer, the term of this patent is extended or adjusted under 35 U.S.C. 154(b) by 0 days.

(21) Appl. No.: 10/338,946

(22) Filed: Jan. 8, 2003

(51) Int. Cl.$^7$ .......................... A47J 37/00; A47J 37/06; A47J 37/08
(52) U.S. Cl. .............................. 99/331; 99/342; 99/344; 99/349; 99/353; 99/372; 99/375; 99/378; 99/379; 99/400; 99/425; 99/445
(58) Field of Search .................... 99/331–333, 342–344, 99/349, 352, 353, 372–384, 400, 401, 425, 444–450; 219/401, 521, 524, 525, 537, 585, 386, 461, 415, 492, 494; 100/92, 305; 126/369, 20; 426/523, 520, 512

(56) References Cited

U.S. PATENT DOCUMENTS

| | | | |
|---|---|---|---|
| 3,880,064 A | * | 4/1975 | Martinex ...................... 99/349 |
| 4,972,766 A | * | 11/1990 | Anetsberger ................ 99/332 |
| 5,473,976 A | * | 12/1995 | Hermansson ................ 99/349 |
| 5,531,155 A | * | 7/1996 | Pellicane et al. ............. 99/372 |
| 5,555,794 A | * | 9/1996 | Templeton et al. ........... 99/349 |
| 5,655,434 A | * | 8/1997 | Liebemann ................... 99/353 |
| 5,676,046 A | * | 10/1997 | Taber et al. .................. 99/340 |
| 5,755,150 A | * | 5/1998 | Matsumoto et al. .......... 99/372 |
| 5,771,782 A | * | 6/1998 | Taber et al. ............. 99/385 X |
| 5,802,958 A | * | 9/1998 | Hermansson ............. 99/379 X |
| 5,839,359 A | * | 11/1998 | Gardener ..................... 99/349 |
| 5,881,634 A | * | 3/1999 | Newton .................... 99/379 X |
| 5,890,419 A | * | 4/1999 | Moravec ...................... 99/349 |

* cited by examiner

Primary Examiner—Timothy F. Simone
(74) Attorney, Agent, or Firm—Ostrolenk, Faber, Gerb & Soffen, LLP

(57) ABSTRACT

A griller includes upper and lower cooking grill members, and a temperature sensing device mounted removably on the housing of one of the grill members. The temperature sensing device includes a casing, a temperature sensing probe, a user input unit, a processor unit, a display unit, and an alarm unit. The temperature sensing probe generates a sensor output corresponding to a cooking temperature detected thereby. The user input unit is operable so as to provide a cooking time setting. The processor unit receives the sensor output and the cooking time setting, and is operable in a timer mode, wherein the processor unit generates an alarm activate signal for activating the alarm unit upon detection by the processor unit that a predetermined time period corresponding to the cooking time setting has elapsed.

7 Claims, 5 Drawing Sheets

GRILLER HAVING A TEMPERATURE SENSING DEVICE WITH A TIMED ALARM CAPABILITY

BACKGROUND OF THE INVENTION

1. Field of the Invention

The invention relates to a griller, more particularly to a griller having a temperature sensing device with a timed alarm capability.

2. Description of the Related Art

A conventional meat griller has a pair of cooking grill members are configured to confine a cooking space for receiving a piece of steak therein when the cooking grill members are closed together. When electric power is supplied to electric heaters of the cooking grill members, the temperature in the cooking space will rise to a preset cooking temperature and will be maintained thereat for cooking the steak piece.

A main drawback of the aforesaid conventional meat griller resides in that the user has to monitor the cooking time so that the steak piece can be cooked as desired.

Another conventional griller is provided with a separable temperature sensing device which can be used to detect the temperature of the cooking grill members or to pierce th steak piece in the cooking space for detecting the temperature of the steak piece. It is desirable to modify the conventional temperature sensing device by providing the same with a timed alarm capability.

SUMMARY OF THE INVENTION

Therefore, the object of the present invention is to provide a griller having a temperature sensing device with a timed alarm capability.

Accordingly, the griller of this invention comprises upper and lower cooking members, and a temperature sensing device.

The upper and lower cooking grill members are coupled to each other, and are configured to confine a cooking space when closed together. One of the upper and lower cooking grill members includes a housing, and a grill plate that is mounted on the housing and that forms one side of the cooking space. The housing has a rim portion formed with a cavity. The cavity has an open insert side, an open viewing side, and an end wall opposite to the open insert side. The end wall is formed with a probe hole to permit access to an interior of the housing proximate to the grill plate.

The temperature sensing device includes a casing, a temperature sensing probe, a user input unit, a processor unit, a display unit, and an alarm unit. The casing is received in the cavity, and is removable from the cavity through the open insert side. The casing has an operating side accessible from the open viewing side when the casing is disposed in the cavity. The temperature sensing probe has a mounting section connected to the casing, and a sensing section extendible into the housing through the probe hole when the casing is disposed in the cavity. The temperature sensing probe generates a sensor output corresponding to a cooking temperature detected thereby. The user input unit is mounted on the operating side of the casing, and is operable so as to provide a cooking time setting. The processor unit is mounted in the casing, and is connected to the temperature sensing probe and the user input unit for receiving the sensor output and the cooking time setting therefrom. The processor unit is operable in a timer mode, wherein the processor unit generates an alarm activate signal upon detection by the processor unit that a predetermined time period corresponding to the cooking time setting has elapsed. The display unit is mounted on the operating side of the casing, and is connected to and controlled by the processor unit so as to provide a visual indication of the cooking temperature detected by the temperature sensing probe and the cooking time setting provided by the user input unit. The alarm unit is mounted in the casing, is connected to the processor unit, and is activated by the alarm activate signal for generating an alarm output.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
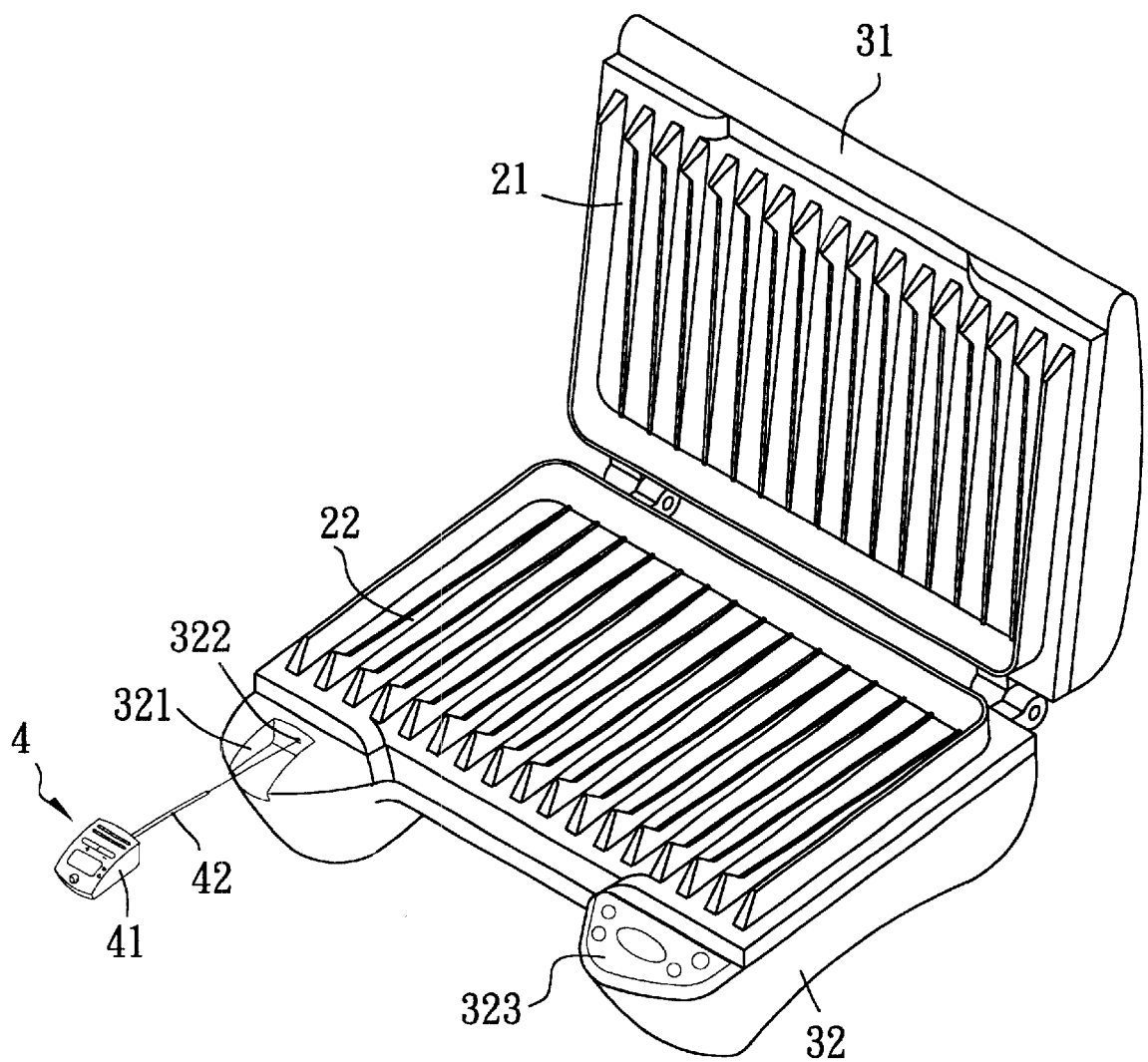
FIG. 1 is a perspective view of the preferred embodiment of a griller according to the present invention, illustrating a temperature sensing device when removed from a housing of a lower cooking grill member.
Figure 2:
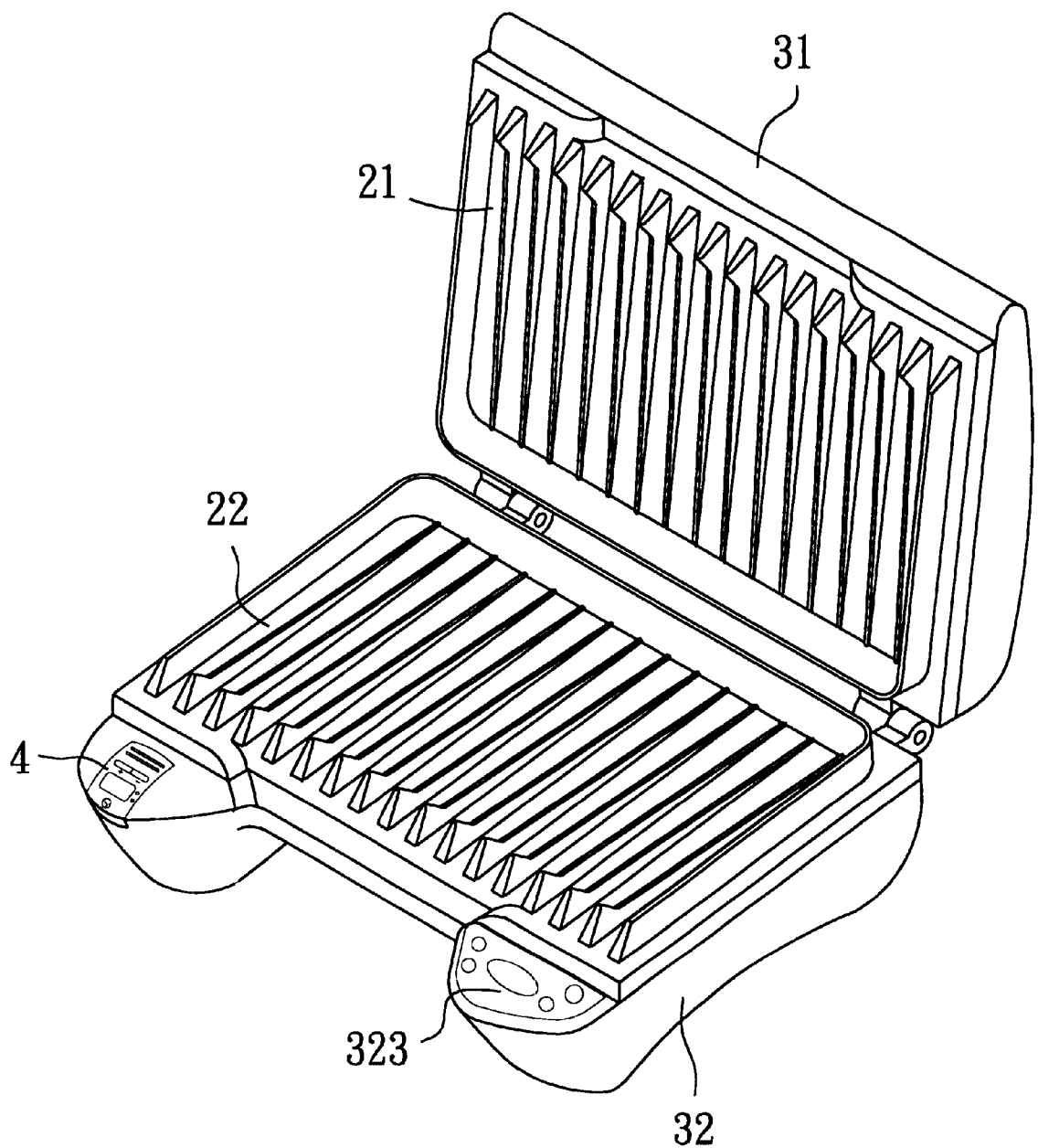
FIG. 2 is another perspective view of the preferred embodiment, illustrating the temperature sensing device when mounted on the housing of the lower cooking grill member.

Referring to FIGS. 1 and 2, the preferred embodiment of a griller according to the present invention is shown to comprise upper and lower cooking grill members, and a temperature sensing device 4.

The upper and lower cooking grill members are coupled pivotally to each other at rear ends thereof, and are configured to confine a cooking space in a conventional manner when closed together. The cooking space is adapted to receive foodstuff, such as a piece of steak, therein. Each of the upper and lower cooking grill members includes a housing 31, 32, and a grill plate 21, 22 that is mounted on the housing 31, 32. The grill plates 21, 22 of the upper and lower cooking grill members form upper and lower sides of the cooking space, respectively. Each of the upper and lower cooking grill members is associated with a respective electric heater (not shown) for heating the grill plates 21, 22 in a conventional manner. The housings 31, 32 protect the user from accidental contact with the grill plates 21, 22.

The front end of the housing 32 of the lower cooking grill member has a left rim portion formed with a cavity 321. The cavity 321 has an open insert side, an open viewing side, and an end wall opposite to the open insert side. The end wall is formed with a probe hole 322 to permit access to an interior of the housing 32 proximate to the grill plate 22. The front end of the housing 32 of the lower cooking grill member further has a right rim portion provided with a control panel 323 for controlling activation and deactivation of the electric heaters and for controlling the cooking temperature. Since the operations associated with the control panel 323 are known in the art, a detailed description of the same will be dispensed with herein for the sake of brevity.

Figure 3:
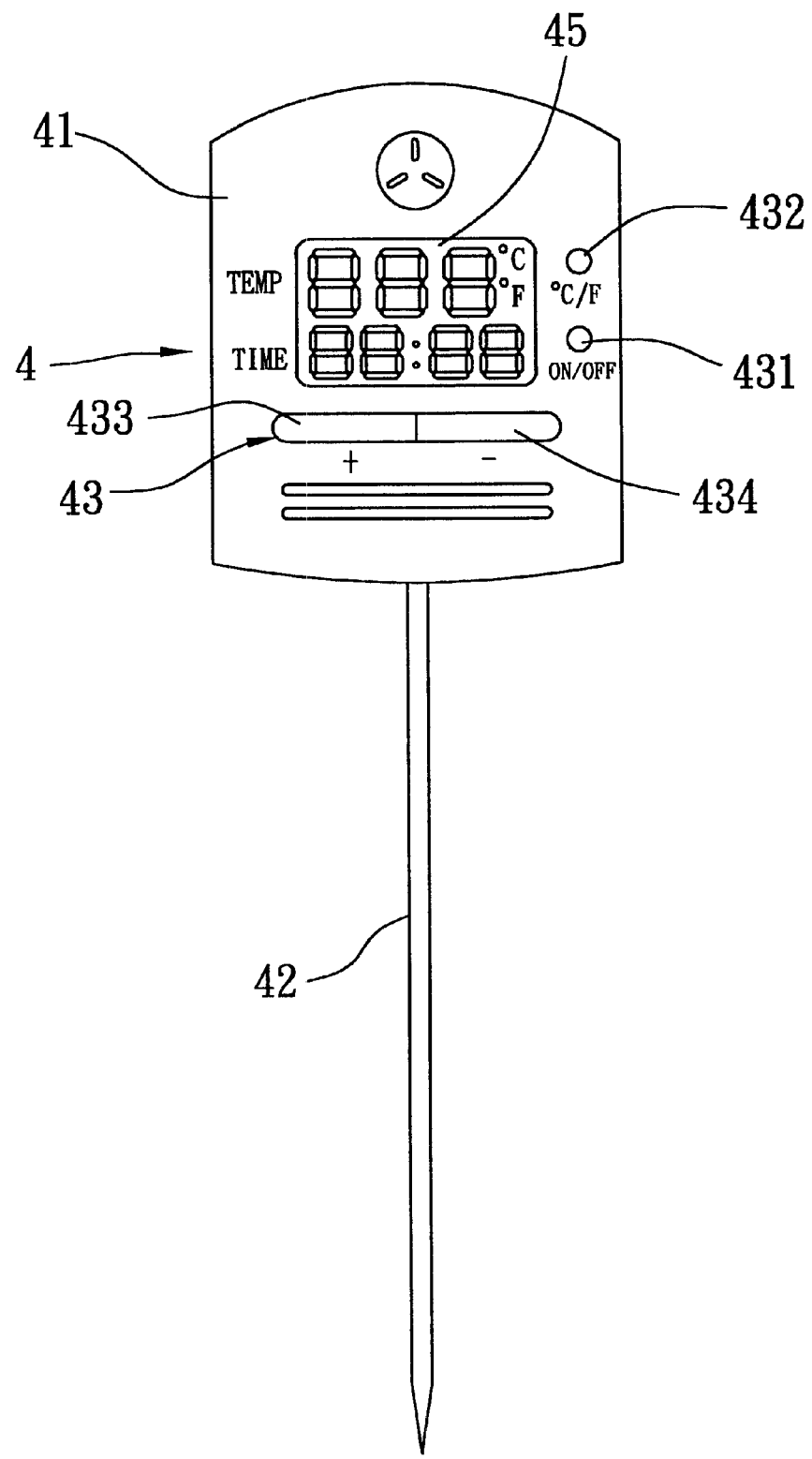
FIG. 3 is a schematic top view of the temperature sensing device of the preferred embodiment of the griller according to the present invention.
Figure 4:
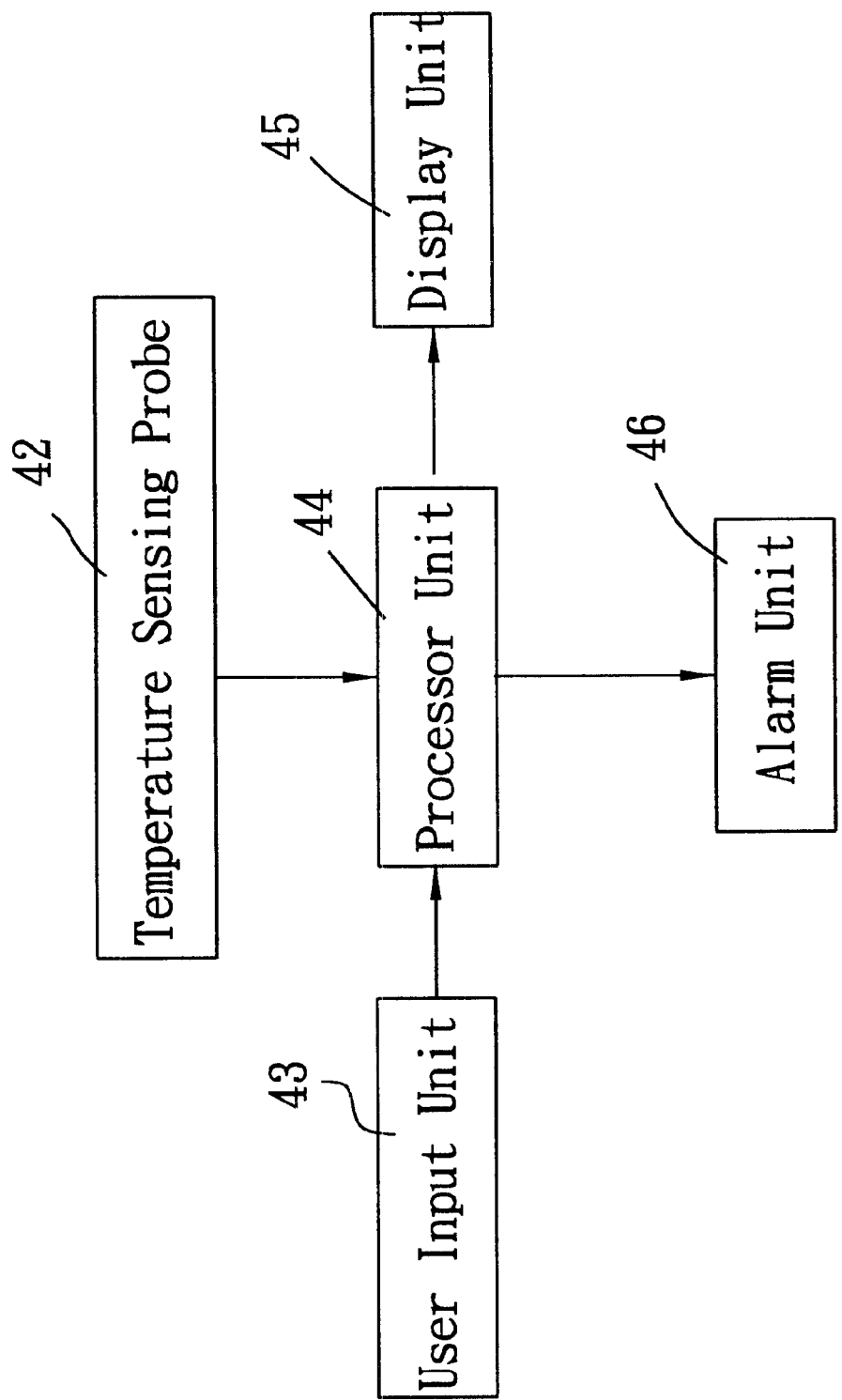
FIG. 4 is a schematic circuit block diagram of the temperature sensing device of the preferred embodiment of the griller according to the present invention.

With further reference to FIGS. 3 and 4, the temperature sensing device 4 is mounted removably on the housing 32 of the lower cooking grill member, and includes a casing 41, a temperature sensing probe 42, a user input unit 43, a processor unit 44, a display unit 45, and an alarm unit 46.

The casing 41 is received in the cavity 321, and is removable from the cavity 321 through the open insert side. The casing 41 has an operating side accessible from the open viewing side when the casing 41 is disposed in the cavity 321.

The temperature sensing probe 42 has a mounting section connected to the casing 41, and a sensing section extendible into the housing 32 of the lower cooking grill member through the probe hole 322 when the casing 41 is disposed in the cavity 321. The temperature sensing probe 42 generates a sensor output corresponding to a cooking temperature detected thereby.

The user input unit 43 is mounted on the operating side of the casing 41, and is operable so as to provide a cooking time setting.

The processor unit 44 is mounted in the casing 41, and is connected to the temperature sensing probe 42 and the user input unit 43 for receiving the sensor output and the cooking time setting therefrom. The processor unit 44 is operable in a timer mode, wherein the processor unit 44 generates an alarm activate signal upon detection by the processor unit 44 that a predetermined time period corresponding to the cooking time setting has elapsed.

The display unit 45 is mounted on the operating side of the casing 41, and is connected to and controlled by the processor unit 44 so as to provide a visual indication of the cooking temperature detected by the temperature sensing probe 42 and the cooking time setting provided by the user input unit 43. In this embodiment, the display unit 45 is in the form of a liquid crystal display. In practice, the display unit 45 can be in the form of other devices suitable for display, such as seven-segment light emitting diodes, and should not be limited to the disclosed embodiment.

The alarm unit 46 is mounted in the casing 41, is connected to the processor unit 44, and is activated by the alarm activate signal for generating an alarm output. In this embodiment, the alarm unit 46 includes a buzzer that generates intermittent beeping sounds within a five second interval upon receipt of the alarm activate signal.

Figure 5:
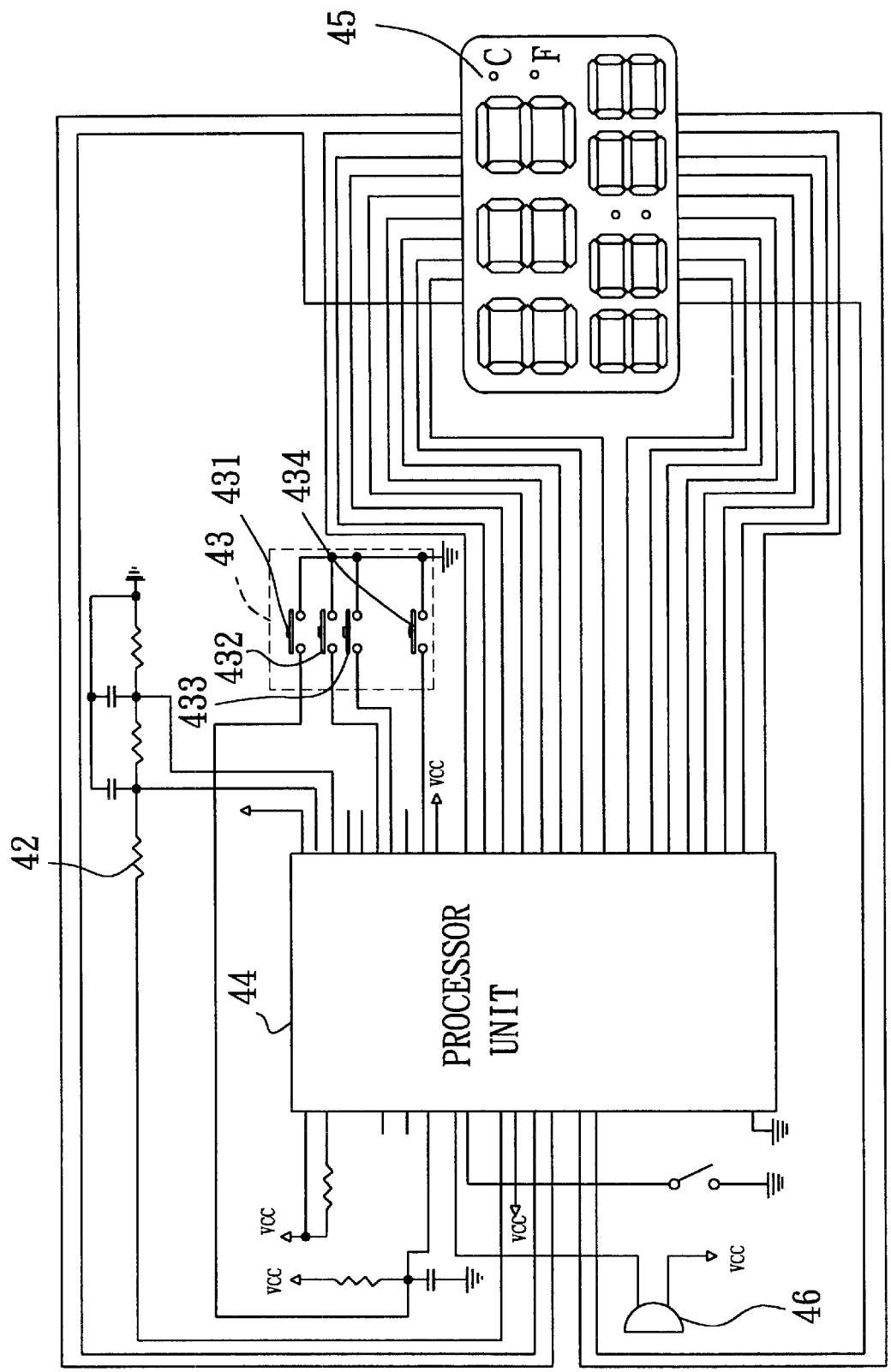
FIG. 5 is a schematic electrical circuit diagram of the temperature sensing device of the preferred embodiment of the griller according to the present invention.

Referring further to FIG. 5, the user input unit 43 includes a set of push button keys mounted on the operating side of the casing 41. The push button keys include a power control key 431, a scale select key 432, an increment key 433, and a decrement key 334. The power control key 431 is operated to control activation and deactivation of the temperature sensing device 4. The scale select key 432 is operated to control the processor unit 44 for toggling the visual indication of the cooking temperature shown on the aforesaid display unit 45 to a selected one of the Celsius and Fahrenheit temperature scales. The increment key 433 is operated for increasing the cooking time setting by one time unit per key depression. The decrement key 434 is operated for decreasing the cooking time setting by one time unit per key depression.

In use, the power control key 431 is operated to activate the temperature sensing device 4. After operating the power control key 431, the temperature sensing device 4 thereafter operates in a cooking time setting mode. At this time, the user can set up the desired cooking time, for example, 10 minutes. After setting the cooking time, the processor unit 44 will operate in the timer mode, and controls the display unit 45 to show the remaining cooking time thereon. During the cooking time countdown, the user can position the casing 41 of the temperature sensing device 4 in the cavity 321, such that the temperature sensing probe 42 extends into the housing 32 of the lower cooking grill member through the probe hole 322 so as to be disposed proximate to the grill plate 22 on the housing 32 for detecting the grill plate temperature. Alternatively, the user can remove the temperature sensing device 4 from the housing 32 of the lower cooking grill member for piercing foodstuff, such as a piece of steak, that is being cooked in the cooking space so as to be able to detect the temperature therein. At the end of the time period corresponding to the cooking time setting (e.g., 10 minutes in this example), the processor unit 44 generates the alarm activate signal for activating the alarm unit 46, thereby alerting the user.

Preferably, the processor unit 44 is configured so as to pause operation in the timer mode when the increment and decrement keys 433, 434 are simultaneously operated to permit adjustment of the cooking time setting through the increment and decrement keys 433, 434, and to continue operation in the timer mode when no further input from the user input unit 43 is detected by the processor unit 44 within a predetermined time period, such as 3 seconds.

Whether or not a steak piece is properly cooked depends on the cooking time. In the present invention, due to the timed alarm capability of the temperature sensing device 4, the cooking time can be set beforehand by the user. Upon cooking a steak piece for a time period corresponding to the cooking time setting, an alarm output will be generated by the griller of this invention to alert the user. As such, steak pieces can be cooked as desired without the need for the user to monitor the grilling operation. Furthermore, the flexibility in applying the temperature sensing device 4 either to detect the grill plate temperature or the food stuff temperature adds another dimension for user convenience.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A griller comprising:

upper and lower cooking grill members coupled to each other and configured to confine a cooking space when closed together, one of said upper and lower cooking grill members including a housing and a grill plate that is mounted on said housing and that forms one side of the cooking space, said housing having a rim portion formed with a cavity, said cavity having an open insert side, an open viewing side, and an end wall opposite to said open insert side, said end wall being formed with a probe hole to permit access to an interior of said housing proximate to said grill plate; and a temperature sensing device including
  a casing received in said cavity and removable from said cavity through said open insert side, said casing having an operating side accessible from said open viewing side when said casing is disposed in said cavity,
  a temperature sensing probe having a mounting section connected to said casing, and a sensing section extendible into said housing through said probe hole when said casing is disposed in said cavity, said temperature sensing probe generating a sensor output corresponding to a cooking temperature detected thereby, a user input unit mounted on said operating side of said casing and operable so as to provide a cooking time setting, a processor unit mounted in said casing and connected to said temperature sensing probe and said user input unit for receiving the sensor output and the cooking time setting therefrom, said processor unit being operable in a timer mode, wherein said processor unit generates an alarm activate signal upon detection by said processor unit that a predetermined time period corresponding to the cooking time setting has elapsed, a display unit mounted on said operating side of said casing and connected to and controlled by said processor unit so as to provide a visual indication of the cooking temperature detected by said temperature sensing probe and the cooking time setting provided by said user input unit, and an alarm unit mounted in said casing, connected to said processor unit, and activated by the alarm activate signal for generating an alarm output.

2. The griller as claimed in claim 1, wherein said user input unit includes a power control key for controlling activation and deactivation of said temperature sensing device.

3. The griller as claimed in claim 1, wherein said user input unit includes a scale select key operable so as to control said processor unit for toggling the visual indication of the cooking temperature shown on said display unit to a selected one of the Celsius and Fahrenheit temperature scales.

4. The griller as claimed in claim 1, wherein said user input unit includes an increment key for increasing the cooking time setting by one time unit per key depression, and a decrement key for decreasing the cooking time setting by one time unit per key depression.

5. The griller as claimed in claim 4, wherein said processor unit is configured so as to pause operation in the timer mode when said increment and decrement keys are simultaneously operated to permit adjustment of the cooking time setting through said increment and decrement keys, and to continue operation in the timer mode when no further input from said user input unit is detected by said processor unit within a predetermined time period.

6. The griller as claimed in claim 1, wherein said processor unit is operable so as to control said display unit to show remaining cooking time thereon.

7. The griller as claimed in claim 1, wherein said alarm unit includes a buzzer.

* * * * *

UNITED STATES PATENT AND TRADEMARK OFFICE
CERTIFICATE OF CORRECTION

PATENT NO.    : 6,615,706 B1
DATED         : September 9, 2003
INVENTOR(S)   : Tsan-Kuen Wu It is certified that error appears in the above-identified patent and that said Letters Patent is hereby corrected as shown below:

<u>Title page,</u>
Item [73], Assignee, should read:
-- Tsann Kuen USA INC, Pasadena, CA (US) --

Signed and Sealed this

Twenty-fifth Day of May, 2004

JON W. DUDAS
*Acting Director of the United States Patent and Trademark Office*